United States Patent [19]

LaBounty

[11] 4,198,747
[45] Apr. 22, 1980

[54] HYDRAULIC SHEAR

[76] Inventor: Roy E. LaBounty, 1607 8th Ave., Two Harbors, Minn. 55616

[21] Appl. No.: 963,092

[22] Filed: Nov. 22, 1978

[51] Int. Cl.² ............................................. B23P 19/00
[52] U.S. Cl. ........................................ 30/134; 30/228; 414/740
[58] Field of Search .................. 414/740; 30/134, 249, 30/258, 228

[56] References Cited

U.S. PATENT DOCUMENTS

| | | | |
|---|---|---|---|
| 2,632,246 | 3/1953 | Shoffner | 30/258 X |
| 3,325,895 | 6/1967 | Grimoldi | 30/228 |
| 3,885,292 | 5/1975 | Sharp | 30/134 X |
| 3,972,097 | 8/1976 | Schakat | 30/228 X |
| 4,104,792 | 8/1978 | LaBounty | 30/134 |

*Primary Examiner*—Jimmy C. Peters

*Attorney, Agent, or Firm*—H. Dale Palmatier

[57] ABSTRACT

A hydraulic shear for a backhoe. The backhoe includes a boom and a forwardly extending stick pivotally mounted to the boom. The hydraulic shear pivotally mounts on the forward end of the stick and includes a first forward shear blade, an opposing second configured forward shear blade, and a configured rearward shear blade which is pivoted to interleave between the first and second forward shear blades. The configured rearward shear blade of the hydraulic shear is mounted so that force from a hydraulic cylinder acting against the configured rearward shear blade is transferred by a factor of two to at least one point on the curvature of the configured rearward shear blade to shear a workpiece at a predetermined preferred position in the hydraulic shear.

12 Claims, 7 Drawing Figures

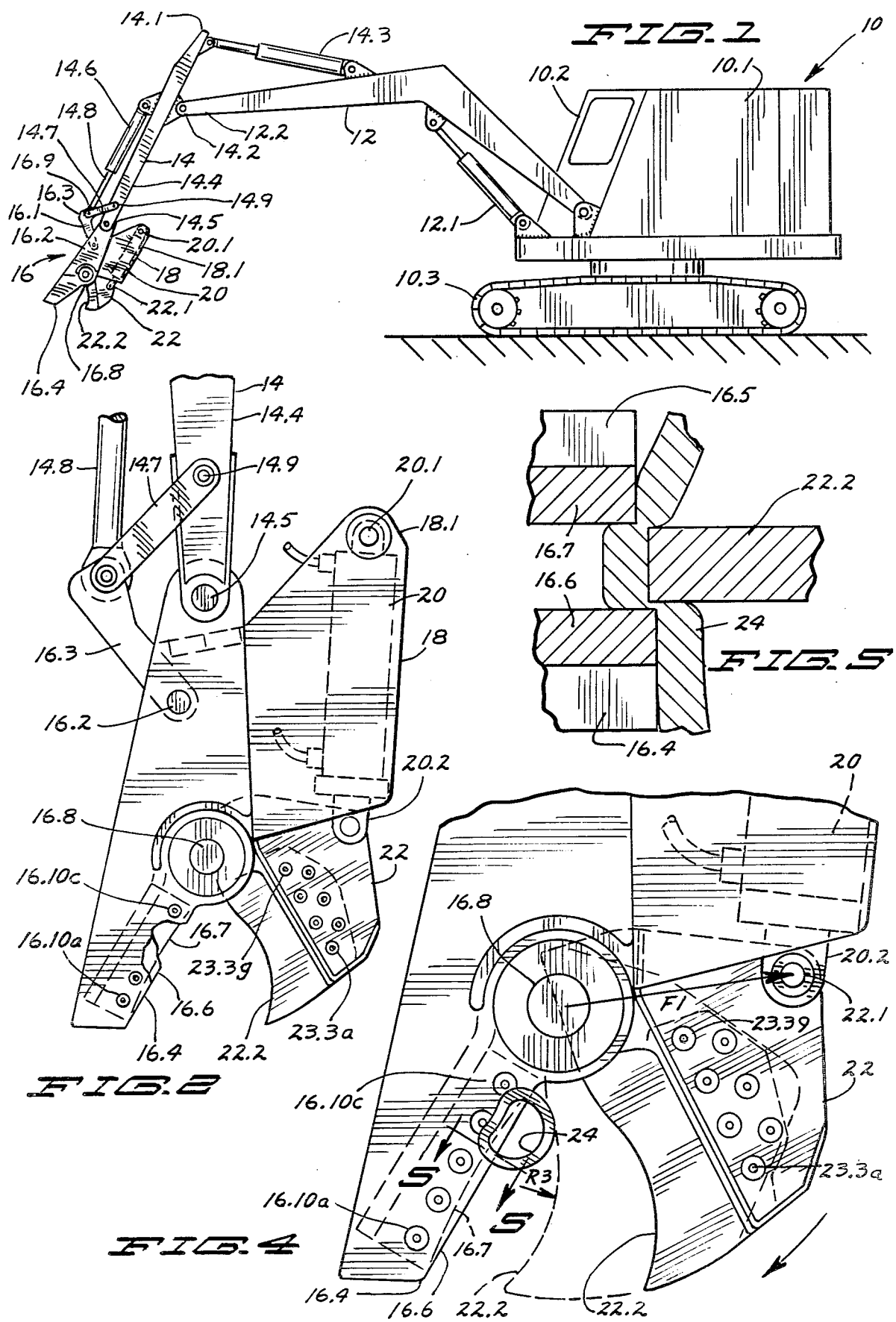

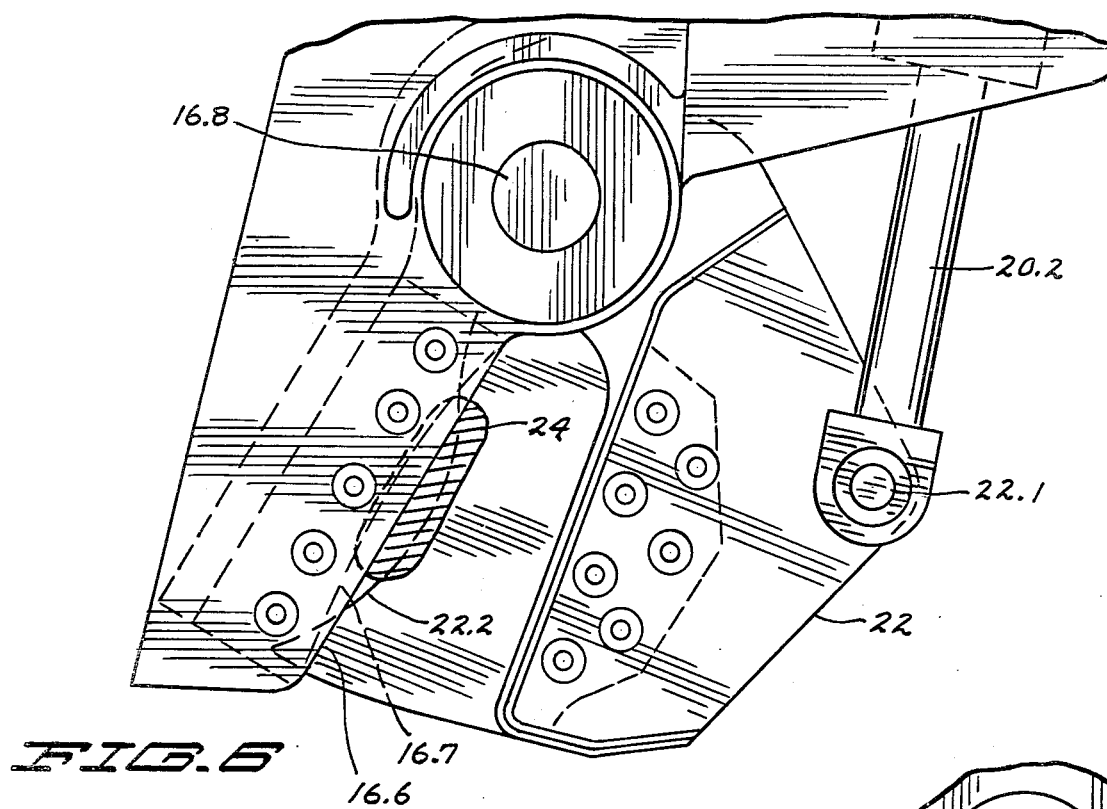
FIG. 6
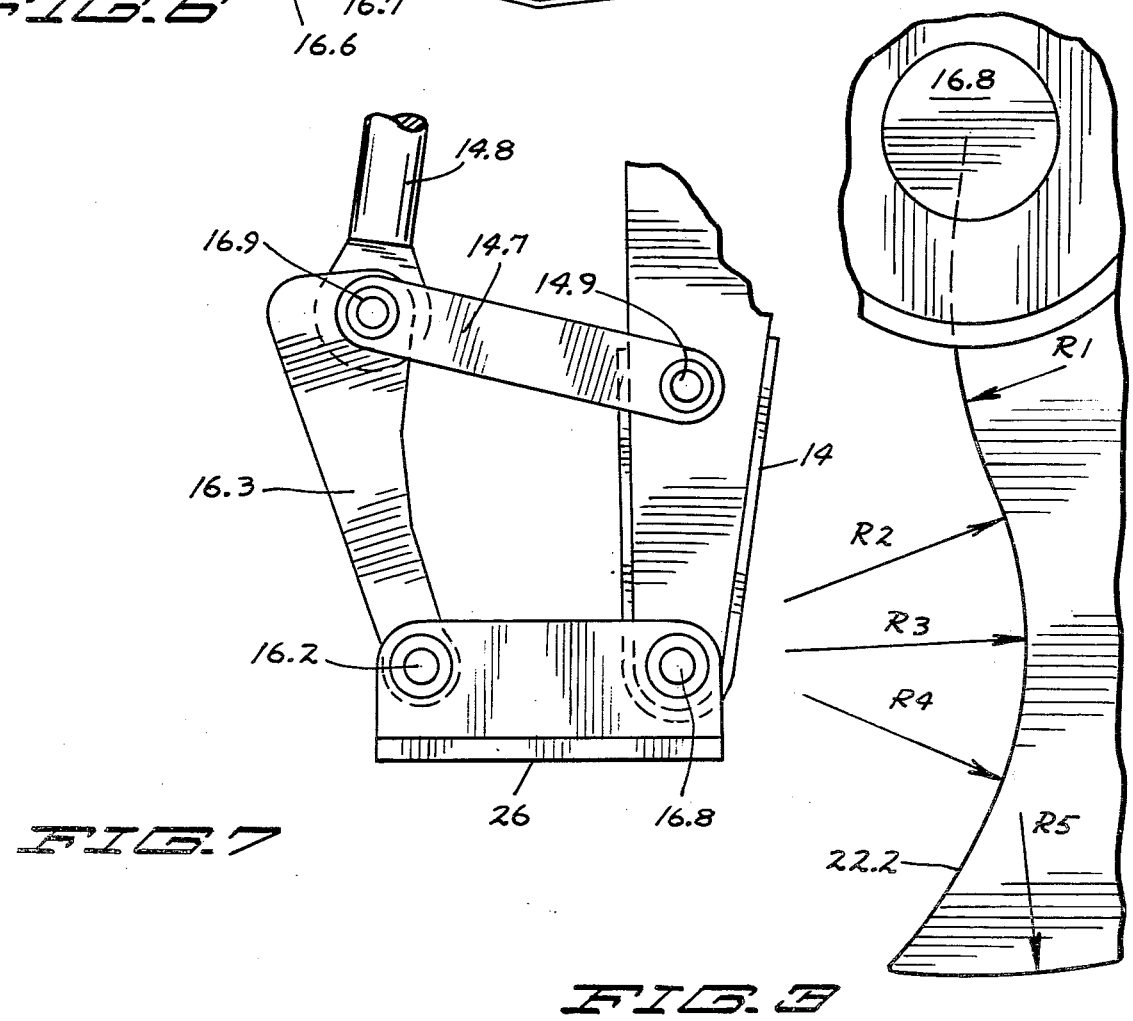
FIG. 7
FIG. 8

HYDRAULIC SHEAR

BACKGROUND OF THE INVENTION

1. Field of the Invention

The present invention relates generally to shears, and more particularly, pertains to a hydraulic shear.

2. Description of the Prior Art

Those concerned with shears have long recognized the need for a heavy-duty hydraulic shear. The present invention fulfills this need.

The prior art shears have failed to provide a hydraulic shear to expediently cut tires off junk cars. This is especially important to the scrap industry as the scrap industry tries to increase production, cut out a step, save a few minutes here and there which over the course of a year makes a difference in the bottom line figure of profit. There has always been a particularly acute need in the scrap industry to quickly get tires off junk cars. The prior art methods such as portable compressors to wrench the tires and rims off was inconvenient, time-consuming, and often times frustrating.

The prior art shears and hydraulic shears have been particularly fragile, and have not had shearing capability to cut the drum and shoe, springs, frames, and rear or front ends from automobile hulks, especially on site at auto junkyards or graveyards.

A hydraulic shear for a backhoe or other like machinery which would avoid the prior art problems as previously discussed above, and which would permit a hydraulic shear to shear any parts of an automobile hulk is greatly desired.

The present invention provides a hydraulic shear that overcomes the disadvantages of the prior art hydraulic shears.

SUMMARY OF THE INVENTION

The general purpose of this invention is to provide a hydraulic shear for shearing automobile hulks and any other scrap shearing.

According to one embodiment of the present invention, there is provided a hydraulic shear having spaced opposing side frames, a first forward shear blade affixed to one of the side frames, and a second configured forward shear blade affixed to the other of the opposing side frames, a pivot pin mounted between the opposing side frames, a configured rearward shear blade mounted on the pivot pin and between each of the opposing side frames, and a hydraulic cylinder mounted between a fixed point and said configured rearward shear blade whereby the hydraulic cylinder moves the configured rearward shear blade between said forward shear blades to shear an object between the blades.

One significant aspect and feature of the present invention is a configured rearward shear blade having a unique radius to transmit maximum shearing force to the object being sheared from the hydraulic cylinder to the configured rearward shear blade. The radii of the configured rearward shear blade is configured to force the sheared object to the maximum force point of the configured rearward shear blade during a shearing operation.

Another significant aspect and feature of the present invention is pivoting the configured rearward shear blade with a hydraulic cylinder through a position which is of maximum shearing force of the configured rearward shear blade where the shearing force is twice the force of the hydraulic cylinder at the point of maximum shearing force of the configured rearward shear blade.

Having briefly described one embodiment of the present invention, it is a principal object hereof to provide a hydraulic shear.

An object of the present invention is to provide a hydraulic shear which will shear parts of junked cars or automobile hulks such as, but not limited to, drums and shoes, springs, frames, rear ends, front ends, and any other metal portions of automobile hulks.

Another object of the present invention is to provide a hydraulic shear having a configured rearward shear blade of radii to act in conjunction with a first forward shear blade and a second configured forward shear blade where the first and second forward shear blades are spaced and opposing to each other, and the second forward shear blade having a concave nonparallel configuration to act in conjunction with a concave configured rearward shear blade which interleaves between the two forward shear blades.

A further object of the present invention is to provide a hydraulic shear which can be easily and readily mounted on any backhoe or the like mechanical equipment, and is suitable for use in junkyards, automobile graveyards and scrap yards. The hydraulic shear is suitable for mounting and adaptation and incorporation as a hydraulic shear into a grapple.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 illustrates a side view of a hydraulic shear, the present invention, on a backhoe;

FIG. 2 illustrates a partially cutaway side view of the hydraulic shear;

FIG. 3 illustrates an enlarged side view of configured rearward shear blade of the hydraulic shear;

FIG. 4 illustrates an enlarged side view of the hydraulic shear with the configured rearward shear blade illustrated in the shearing positioning;

FIG. 5 illustrates a section taken on line 5—5 of FIG. 4 looking in the directions of the arrows;

FIG. 6 illustrates a second enlarged side view of the hydraulic shear with the configured rearward shear blade illustrated in a shear position, and;

FIG. 7 illustrates a side view of a mounting plate for attaching the hydraulic shear to the backhoe.

DESCRIPTION OF PREFERRED EMBODIMENT

FIG. 1, which illustrates a side view of the present invention, a hydraulic shear 10, shows a backhoe unit designated generally as 10 including a swing house 10.1 with a control cab 10.2, and a track assembly 10.3 which the swing house 10.1 swingably mounts to in the usual fashion to permit the swing house 10.1 to swing in a horizontal plane. A forwardly extending boom 12 is pivotally attached to the swing house 10.1 for swinging in a vertical plane. A hydraulic cylinder 12.1 mounts as illustrated and known in the art to swing the boom 12 in a vertical up and down directions. A forwardly extending stick 14 pivotally mounts adjacent the rear end 14.1 to the forward end 12.2 of the boom 12 by a transverse pivot pin 14.2 to enable the stick 14 to swing up and down in a vertical plane with respect to the boom, and in the same plane as the boom 12 is permitted to swing. A hydraulic cylinder 14.3 mounts between the boom 12 and the rear end 14.1 of the stick 14 to swing the stick 14 up and down. A pivot pin 14.5 passes through the stick 14, and pivotally mounts a hydraulic shear 16 as later described to the forward end 14.4 of the stick 14 so that the hydraulic shear 16 can pivot upwardly and downwardly in a vertical plane. Another pivot pin 16.2 pivotally mounts an upwardly and rearwardly extending link 16.1 to the hydraulic shear 16. A hydraulic cylinder 14.6 mounts toward the rear end 14.1 of the stick 14, and extends forwardly for pivotal attachment to the rearward end of the link 16.3. A spacer link 14.7 pivotally connects between the forward end 14.4 of the stick 14, to the pivoting connection between the hydraulic cylinder 14.6, and the link 16.3 as illustrated in the figure such that when the piston 14.8 is retracted within the cylinder 14.6, the hydraulic shear 16 pivots upwardly in the vertical plane.

The hydraulic shear 16 includes a pair of spaced opposing side frames 16.4 and 16.5 as illustrated in FIG. 5 mounted on the pivot pin 14.5, a first forward shear blade 16.6 affixed to the side frame 16.4 with suitable nut and bolt assemblies 16.10a–16.10e, and a second configured forward shear blade 16.7 as illustrated in FIG. 5 affixed to the opposing side frame 16.5 with suitable nut and bolt assemblies. The second configured forward shear blade 16.7 has concave curvature of a large radius as later described in FIG. 2. A mounting plate 18 affixes to either one of the side frames 16.4 or 16.5 such as with nut and bolt assemblies or welding. A hydraulic cylinder 20 attaches to the forward end 18.1 of the mounting plate 18 with a pivot pin 20.1. A rearward shear frame 22 mounts on a pivot pin 16.8 to interleave between the spaced opposing side frames 16.4 and 16.5. The piston 20.2 of the hydraulic cylinder 20 extends outwardly for connection to the rearward shear frame 22 about a pivot pin 22.1. A configured rearward shear blade 22.2 as later described having opposing concave curvature to the second configured forward shear blade 16.7 bolts to the rearward shear frame 22 with suitable nut and bolt assemblies 22.3a–22.3g. The hydraulic cylinder 20 is positioned so that on retraction as illustrated by way of the figure, the rearward shear frame 22 is retracted rearwardly and upwardly into an open position thereby carrying the configured rearward shear blade 22.2. As the piston 20.2 of the hydraulic cylinder 20 is extended, the configured rearward shear blade 22.2 is closed downwardly into and between the first forward shear blade 16.6 simultaneously and subsequently, the second configured forward blade 16.7 as later described.

FIG. 2, which illustrates a partially cutaway side view of the hydraulic shear 16 shows the first and second shear blades 16.6 and 16.7 respectively in more detail. The configured rearward shear blade 22.2 carried on the rearward shear frame 22 is illustrated in an open position prior to commencing a shearing operation. All other numerals correspond to those elements previously delineated.

FIG. 3, which illustrates an enlarged side view of a configured rearward shear blade 22.2 of the hydraulic shear 10 shows the rearward shear blade illustrated in reduced scale. The concave configured rearward shear blade 22.2 is structured on a first radius R1 of eight inches, a second radius R2 of twenty inches, a third radius R3 of ten inches, and a fourth radius R4 of twenty inches as illustrated in the figure. The first, second and third radii are unequal to the other respective radii resulting in the concave rearward shear blade 27.2 having the illustrated concave configuration, especially with respect to the opposing concave second configured forward shear blade 16.7 having a large radius. The configuration of the rearward shear blade provides for automatic and simultaneous positioning of the object in a maximum force position during the shearing process as later described. The radius R5 of the bottom of the rearward shear blade 22.2 is twenty-three and one-half inches from the center of the pivot point 16.8.

PREFERRED MODE OF OPERATION

The operation of the hydraulic shear 16 is described with reference to the FIGS. 1–6.

FIG. 4 illustrates an enlarged side view of the hydraulic shear 10 with the configured rearward shear blade 22.2 illustrated in dashed lines in a shearing position shearing a work piece 24. During hydraulic shearing, the hydraulic shear 16 is suitably positioned over and around a work piece 24 such as a tire rim, spring, axle, frame, or other subject such that the first and second forward shear blades 16.6 and 16.7 are positioned over a forward side of the work piece 24, and the configured rearward shear blade 22.2 is positioned over the rearward side of the work piece 24. Subsequently and through the hydraulic lines, the hydraulic cylinder 20 is actuated so that force is transmitted by the piston 20.2 about the pivot pin 22.1 causing the rearward shear frame 22 to move about the pivot pin 16.8 carrying the configured rearward shear blade 22.2 forwardly towards the first and second forward shear blades 16.6 and 16.7 and in between the blades 16.6 and 16.7 respectively. During movement, the force of the piston 20.2 acting at the pivot pin 22.1 is transmitted along the radial force line F1 to the pivot pin 16.8, and subsequently down along the configured radii R1-R4 of the configured rearward shear blade 22.2. Maximum force is transmitted along the radii of the configured rearward shear blade 22.2 at the radial force line F2 where the distance of the force line F1 between pivot pins 22.1 and 16.8 is equal to half of the distance of the force line F2 from the pivot pin 16.8 to the pivot pin 22.1 on the rearward shear frame 22, or 2F2=F1. The force F then decreases along the lower radii of the rearward configured concave shear blade, and is approximately equal to one and one-half times the force F1 in the center portion of the configured rearward blade, especially at the point of radius R3. The concave portions of the concave configured second forward shear blade 16.7 and the concave configured rearward shear blade 22.2 intersect along the radii during the shearing operation as now described. The shearing of the workpiece 24 is determined by the predetermined preferred position of the least radius R3 wherein the radius is positioned towards the middle of the configured rearward shear blade 22.2 in that the workpiece is not sheared near the pivot 16.8 of the jaws or near the bottom edge of the jaws. The radius R3 is significantly smaller than the radii R2 or R4, and results in the radii R2 and R4 forcing the workpiece to the significantly smaller radius R3. Forcing the workpiece 24 to the significantly smaller radius R3 is of particular safety importance as one can predetermine the likelihood of the position of shearing the workpiece between the jaws and produces the result of consistent shearing on the small radius R3 where the shearing force is in the range for maximum shearing of the workpiece 24 and protection of the hydraulic shear 16, especially the pivot point 16.8 against damage from the workpiece 24. Workpiece has been used as an inclusive term and encompasses such objects as wood, steel shafts, concrete reinforcing rods, iron pipe, truck frames, etc.

FIG. 5 illustrates a section taken on line 5—5 of FIG. 4 looking in the direction of the arrows showing the spaced opposing side frames 16.4 and 16.5, the first forward shear blade 16.6 and the second concave configured shear blade 16.7 offset to the first shear blade 16.6, the concave configured rearward shear blade 22.2, and the workpiece 24 being sheared in between the three shear blades 16.7, 16.6, and 22.2 respectively. The first forward shear blade 16.6 has a leading edge which leads the second configured forward shear blade 16.7 as is shown in FIG. 5 and also illustrated in the partially cutaway view of FIG. 2. The object 24 is sheared first between blades 16.6 and 22.2, and then, by blades 16.5 and 22.2. The maximum shearing force of the workpiece 24 occurs on the ten inch radius.

FIG. 6 illustrates another enlarged side view of the hydraulic shear 16 with the configured rearward shear blade 22.2 illustrated in the shearing position in between the first and second forward shear blades 16.6 and 16.7. All numerals correspond to those elements previously delineated.

FIG. 7 illustrates the mounting plate for a multidirectional grapple, the subject matter of U.S. Pat. No. 4,017,114, which is assigned to the assignee of the present invention. The hydraulic shear 16 can be utilized in lieu of either the front or the back jaw of the grapple.

Various modifications can be made to the hydraulic shear 16 without departing from the apparent scope of the invention.

Having thus described the invention, what is claimed is:

1. Hydraulic shear for shearing a workpiece comprising:
   a. spaced opposing side frames mounted on a first pivot point;
   b. first forward shear blade affixed to one of said side frames;
   c. second forward shear blade affixed to the other of said side frames;
   d. rearward shear frame rotatably mounted on said first pivot point and in between said spaced opposing side frames;
   e. configured rearward shear blade including a shearing edge configured on at least two different radii, one radius being less than the other radius, affixed to said rearward shear frame, and;
   f. first hydraulic cylinder affixed between a second pivot point and a third pivot point on said rearward shear frame whereby said first hydraulic cylinder moves said rearward shear frame forward thereby carrying said configured rearward shear blade forward between said forward shear blades to shear said workpiece between said blades and the force of shearing being maximum over one point on said least radii of said configured rearward shear blade.

2. The hydraulic shear of claim 1 wherein said maximum force on said configured rearward shear blade is twice the force exerted by said first hydraulic cylinder whereby the distance between said first and third pivot point is equal to twice the distance between said first pivot point and said maximum force point over one point on said least radii.

3. The hydraulic shear of claim 1 wherein said second opposing shear blade is offset to the rear of said first forward shear blade and concave with respect to said configured rearward shear blade.

4. The hydraulic shear of claim 1 wherein said configured rearward shear blade is concave and includes at least a twenty inch radius and a ten inch radius.

5. The hydraulic shear of claim 1 wherein said configured rearward shear blade is concave and includes a first twenty inch radius, a ten inch radius, and a second twenty inch radius, and all of said radii positioned on different centers whereby said twenty inch radii forces said workpiece to said least radii for maximum shearing force.

6. The hydraulic shear of claim 1 wherein said configured rearward shear blade is concave and includes in order from said first pivot point an eight inch radius, a twenty inch radius, a ten inch radius, and a twenty inch radius, all of said radii positioned on different centers whereby said twenty inch radii forces said workpiece to said ten inch radius for maximum shearing force.

7. The hydraulic shear of claim 1 wherein the shearing edge of said configured rear shear blade is illustrated by the configuration of FIG. 3.

8. The hydraulic shear of claim 1 comprising a forwardly extending stick of a backhoe, a fourth pivot point mounting said spaced opposing said frames to said stick, a fifth pivot point, and a second hydraulic cylinder affixed between said stick and said fifth pivot point.

9. The hydraulic shear of claim 1 comprising wherein said shear is positioned on one of the jaws on a grapple.

10. The hydraulic shear of claim 1 wherein said configured rearward shear blade is concave and includes a first radius, a second radius significantly smaller than said first radius, and said second large radius, and all of said radii positioned on different centers whereby said large radii forces said workpiece to said small radii for maximum shearing force.

11. The hydraulic shear of claim 1 wherein said configured rearward shear blade is concave and includes in order from said first pivot point a least radius, a first large radius, all of said radii positioned on different centers whereby said large radii forces said workpiece to said second radius for maximum shearing force.

12. Hydraulic shear for shearing a workpiece comprising:
   a. spaced opposing longitudinal side frames mounted on a first pivot point, said first pivot point positioned towards a lower end of said spaced opposing longitudinal side frames;
   b. first longitudinal forward shear blade bolted to one of said side frames;
   c. second longitudinal forward shear blade bolted to the other of said side frames, said second shear blade including a slight concave radius curvature nonparallel shearing edge and offset to the rear of said rearward shear blade;
   d. mounting plate affixed towards an upper end of one of said spaced opposing longitudinal side frames;
   e. rearward shear frame rotatably mounted about said first pivot point and in between said spaced opposing side frames;
   f. configured rearward shear blade including a slight concave radius curvature shearing edge opposing said second forward shearing blade and configured on radii of a first radius of eight inches, a second radius of twenty inches, a third radius of ten inches, and a fourth radius of twenty inches in order from said first pivot point and all of said radii positioned on different centers and;

g. first hydraulic cylinder affixed between a second pivot point on said mounting plate and a third pivot point on said rearward shear frame whereby said first hydraulic cylinder moves said rearward shear frame forward thereby carrying said configured rearward shear blade forward between said first longitudinal forward shear blade and said second longitudinal offset configured shear blade to shear an object between said blades, and the force of shearing of maximum shearing being twice the force exerted by said hydraulic cylinder where the distance between said first and third pivot is equal to twice the distance between said first pivot point and said maximum shearing force point on said ten inch radius.

* * * * *